United States Patent

[11] 3,553,387

[72] Inventor George William Wells
London, England
[21] Appl. No. 683,073
[22] Filed Oct. 26, 1967
[45] Patented Jan. 5, 1971
[73] Assignee International Standard Electric Corporation
New York, N.Y.
a corporation of Delaware
[32] Priority Oct. 28, 1966
[33] Great Britain
[31] No. 48372/66

[54] DIALING APPARATUS

2 Claims, 7 Drawing Figs.

[52] U.S. Cl. 179/90
[51] Int. Cl. H04m 1/45
[50] Field of Search 179/90B, 90CI, 5, 90ADO, 90BD

[56] References Cited
UNITED STATES PATENTS
3,078,349 2/1963 Sasaki 179/90
3,025,358 3/1962 Hymel 179/90

*Primary Examiner*—Kathleen H. Claffy
*Assistant Examiner*—Tom D'Amico
*Attorneys*—C. Cornell Remsen, Jr., Rayson P. Morris, Percy P. Lantzy, J. Warren Whitesel, Phillip A. Weiss and Delbert P. Warner

ABSTRACT: Whereas in the ordinary card dialer a card is put in a slot in the machine and is read by feelers, in this dialer all the cards are in the machine. Each has its own position therein to which a push button corresponds, and pushing a button closes contacts to electrically select and read the card for the wanted number.

DIALING APPARATUS

The present invention relates to a repertory dialler, such as may be used in automatic telephone systems.

Such a dialler is used in telephone systems at a subscriber's station and enables him to establish a call to a wanted line without having to dial the full number of that line. The present invention seeks to provide a relatively simple dialler of this general type.

According to the present invention there is provided a repertory dialler, such as used at a telephone subscriber's station for the transmission therefrom of wanted subscribers' numbers, which includes a receptacle for a number of members each bearing a coded representation of a wanted subscriber's number, selection means on the outside of said receptacle and manually operably to select for use one of said members, reading means responsive to the selection of one of said members to read the coded representations therefrom, and signalling means under the control of said reading means for sending to an exchange signals corresponding to the coded representation read from the selected one of said members.

According to the present invention there is also provided a repertory dialler, such as used at a telephone subscriber's station for the transmission therefrom of wanted subscribers' numbers, which includes a receptacle for the reception of a number of cardlike members on each of which there is a coded representation of a wanted subscriber's number, said receptacle containing a number of said cardlike members when the dialler is in use, a set of pushbuttons or the like on the outside of said receptacle, one for each of a number of positions in said receptacle each of which positions can be occupied by one of said cards, reading means adapted to read the coded representation of a number from any one of the cards in said receptacle in response to the operation of the appropriate one of said pushbuttons or the like, and signalling means under the control of said reading means for sending the number corresponding to said coded representation over a line outgoing from the dialler.

An embodiment of the invention will now be described with reference to the drawings accompany the Provisional Specification, in which.

Figure 3:
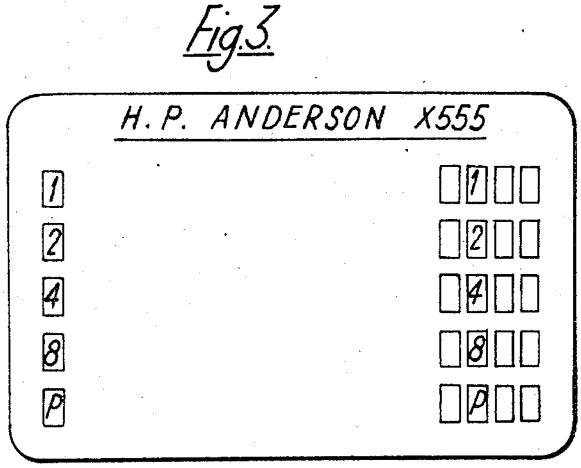
FIG. 3 shows one of the cards used in the dialler of FIGS. 1 and 2.

The numbers to be handled are each coded onto a cardlike member of a suitable insulating material, one of these cards being shown in FIG. 3. It has five rows of hole positions, of which the top four are respectively weighted 1, 2, 4, 8. Each digit of the number uses one column of hole positions, with the coding on a binary basis. The fifth row of hole positions labeled P, is used to initiate interdigital pauses. The cards each have room for a maximum of 19 digits and pauses, that is, there are 19 columns of hole positions.

Unlike certain known card diallers, the pack of cards coded for the constantly wanted numbers are located inside the body each being located in its slot. To call one of the numbers, the subscriber lifts his handset and when he receives dial tone he pushes one of a number of selection buttons such as 1, Fig. 2 on the outside of the instrument body. Each of the cards is held in its slot in a slanted position with its upper edge showing, this edge bearing the name of the subscriber to which it relates. The button for each card is longitudinally aligned with it. Outpulsing now starts, with pauses for any additional signals such as tones where necessary.

The call can be abandoned at any time by pressing the release button 2, which releases the selection button and also removes a short circuit across the telephone set which applied to it when the selection button was operated. If the release button is not operated after a call, no new selection can be made, and the existing selection does not cause a repeated call, because, as will be seen later, the outpulsing circuit has not been reset.

To change a card, a catch 3 at the front of the instrument is released, and the cover thereof, which is of a plastics material, is swung back. The code card can now be removed by pulling it out of its slot and a new card inserted in its place. The cover is then replaced. Separate labelling of the cards and the buttons is not needed as the name or directory number at the top of the card can be seen and serves this purpose, see Fig. 2.

Figures 4, 5:
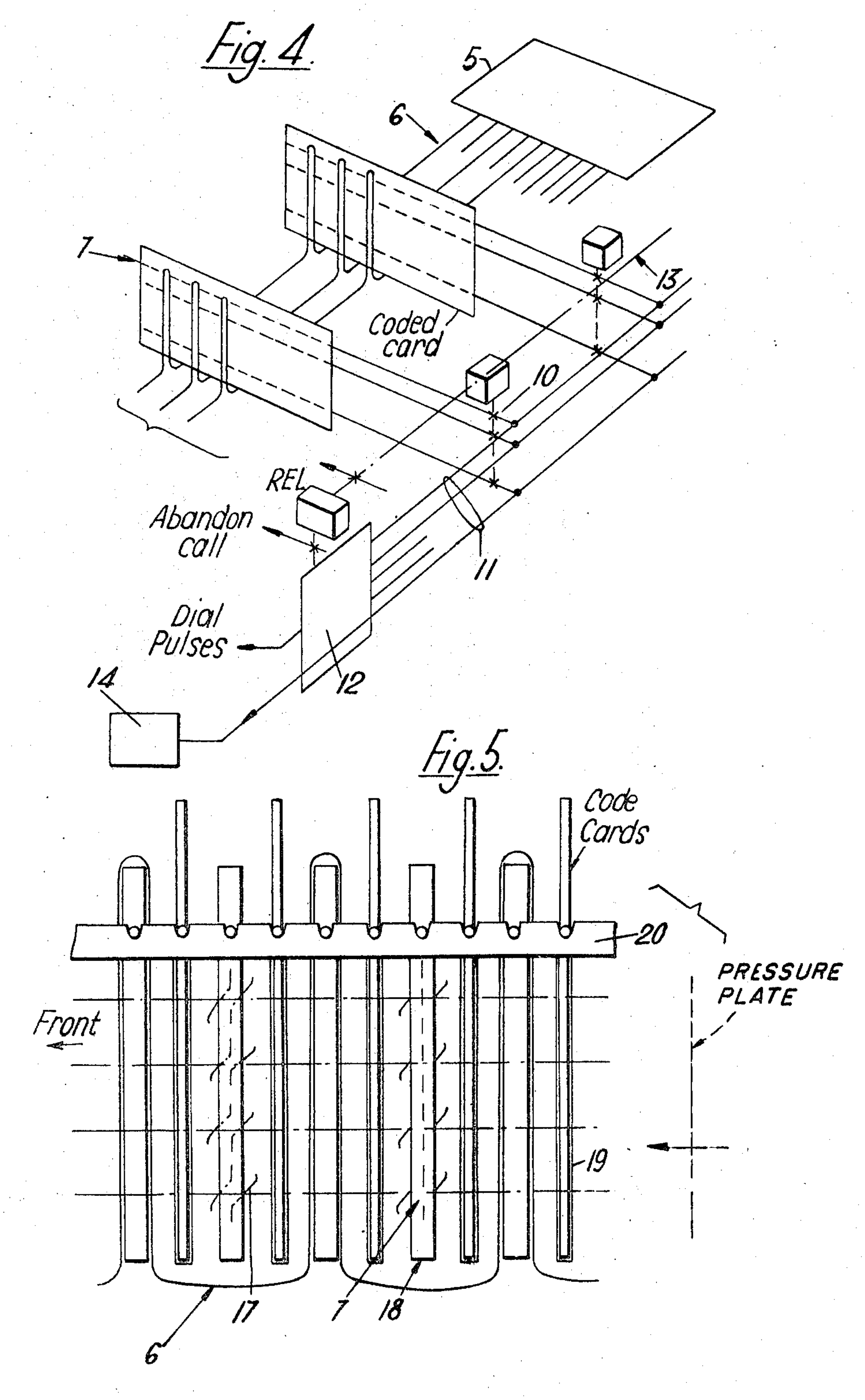
FIG. 4 is an exploded perspective view explanatory of the operation of the dialler.
FIG. 5 is a partial view of the arrangement of the cards, one per subscriber constantly called, in the instrument.

FIG. 4 shows the general arrangement of the card reading means, and it will be seen that reading is on a coordinate basis. As there are up to 19 digits and pauses possible, the operation is controlled by a 19-stage electronic stepping switch indicated at 5. Wires such as 6 which are referred to as digit busses extend from this switch to all card positions, as can be seen in FIG. 4. Each of these wires is bent up on one side of each card. Adjacent the other side of each card is a set of five leads such as 7 called the binary busses.

The binary busses are connected via normally open contacts indicated by crosses such as 10 to a further set of wires 11, which in turn feed a binary counter 12.

When the caller operates a selection button (any one), it closes the set of contacts for its card position so that the binary busses therefore are all connected to the common wires 11. At the same time a locking bar indicated schematically at 13 is moved to lock the depressed button down and to disable all of the other selection buttons.

When the cards are in position, the digit busses are caused to make electrical contact with the binary busses through the holes in the cards, in a manner to be described later. Another result of pressing a selection button is that the switch 5 is started and it pulses its 19 output leads the digit busses 6, one after the other at a rate dependent on the digit-sending rate. If it is necessary to do so to avoid spurious pulsing of the binary busses, they may include diodes or other impedances between the intersections with the digit busses. Spurious pulsing could occur, for instance if the first digit of a number was 3, 0011 in binary, in which case when the first digit bus is pulsed, pulses appear on binary busses 1 and 2. If, say, the sixth digit is 9, 1001 in binary, the pulse on binary bus 1 could be communicated via digit bus 6 to the binary bus for 8. This could be avoided by suitably located diodes or other components as mentioned above.

When each digit bus is pulsed, the pulses produced thereby reach the counter 12 via leads 11, and control outpulsing. The device indicated at 14 controls the interdigital pause.

When the dialling is completed, or to abandon a call, the release button is operated, which releases the locking bar 13 to reset the depressed selection button, unshorts the telephone set, and resets the switch 5.

The coded cards, and digit and binary busses are arranged as shown in FIG. 5. The binary busses such as 7 have 19 fingers such as 17 along their length which project outwards. Five of these binary busses are embedded into each side of a plastics binary board such as 18 which serves two coded cards. The binary busses are connected by flexible wiring at one end of their boards to one side of the make contacts associated with the selection buttons. The digit busses consist of a continuous ribbon indicated at 6 of plastics tape having 19 copper strips embedded in one surface, the other surface being in contact with binary boards and having no busses, as shown in FIG. 5. One each of the copper conductors is connected to the electronic stepping switch 5, Fig. 4.

Figures 6, 7:
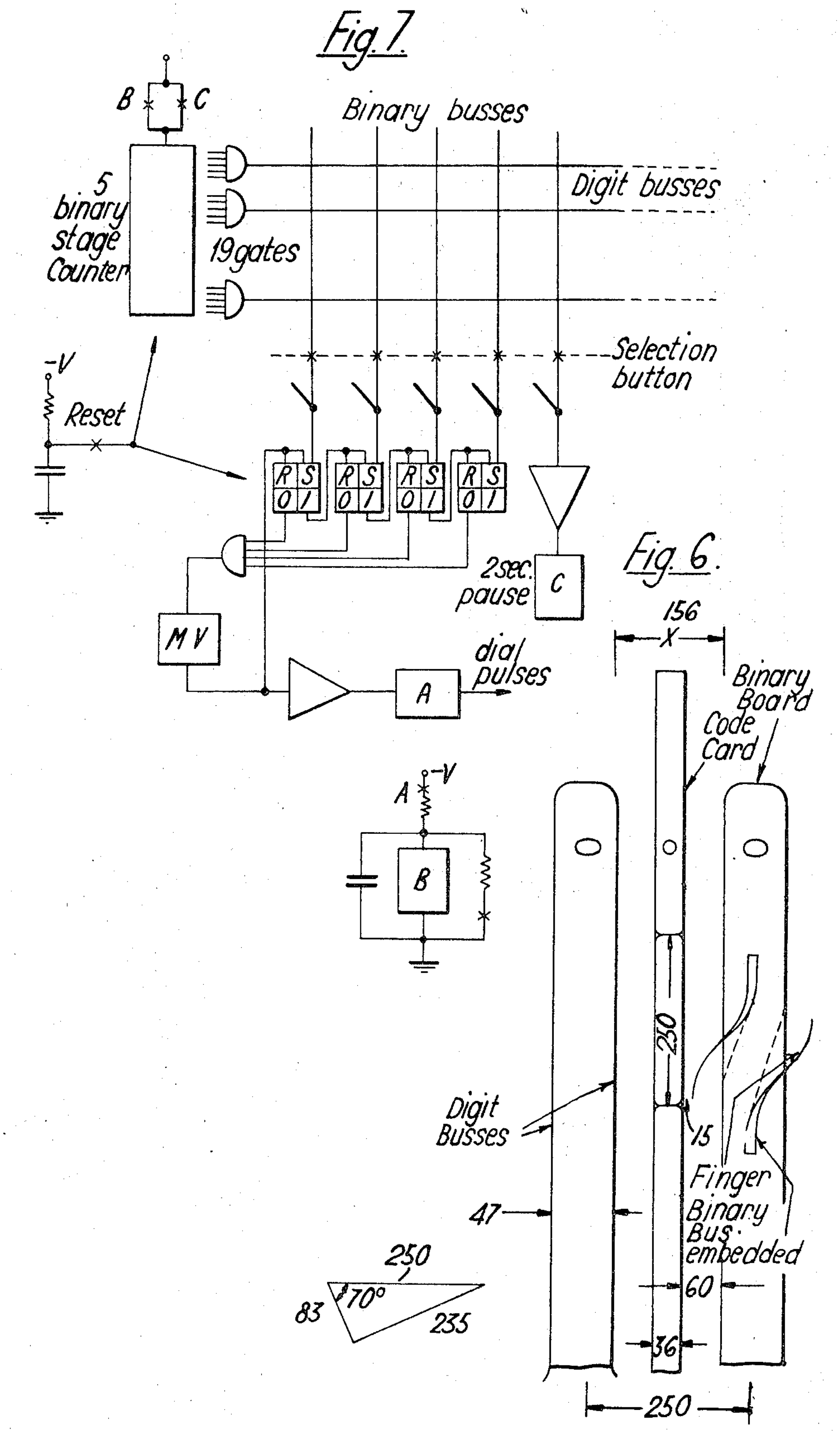
FIG. 6 is an enlarged fragmentary view of part of FIG. 5.
FIG. 7 is the electrical circuit diagram of the dialler.

It should be noted that in the position shown in FIG. 5 the coded cards can be freely inserted or removed from their slotted holders such as 19, each of which is pivoted on a pair of rails such as 20, one on each side of the instrument. This insertion or removal does not injure the fingers on the binary busses. This is the condition which exists when the cover of the instrument is pivoted back. When the cover is closed a hinged or pivoted pressure plate at the back of the card receptacle pushes the bottom of the cards and boards forward. This pivots both the cards and the boards about the pins which support the card holders such as 19 and the boards such as 18 on the rails 20, so that the fingers pass either through the card or are pressed flat as indicated in FIG. 6. One possible card and board hinging arrangement is shown in FIG. 5. The pressure plate is schematically indicated by the dashed vertical line intersected by the dashed arrow. Since the instrument cover is longer than the plate a mechanical advantage exists when the cover is being closed. Springs to restore the cards and boards to their position shown in FIG. 5 when the cover is opened are not necessary since a great many of the fingers will have been pressed flat and will serve this purpose. The pressure plate will turn through about 70° and therefore the code cards will lie at about 20° to the horizontal when the cover is closed, making an eminently readable display.

Dimensional restrictions determine the size and shape of the hole to be punched in the code cards and the separation between them. This is shown in FIG. 6, in which all dimensions are in mils, i.e. thousandths of an inch. A code card is 36 mils thick so that a finger, to reach through and apply contact pressure, must stand out from the binary board about 45 mils in the unstressed state. This means that the distance between the ends of these fingers and the code card should be about 15 mils to give adequate clearance for insertion. The total distance X then is 156 mils. The distance between the centers of the binary boards is also the distance between the centers of the code cards, and this distance determines the amount of card visible in the operational state, say 250 mils. This means that the binary boards are 47 mils thick. Since the distance between the centers of the binary boards is 250 mils when the instrument cover is open and 83 mils when it is closed, the angle the boards must turn through is 70°.

A finger should not touch the edges of the hole in the card to avoid getting caught up. When the cards and boards are swung through 70° the fingers move vertically, relative to the cards, through 235 mils, the last part of this travel providing a wiping action on the surface of the digit bus. Thus the card holes should be about 250 mils long.

Figure 1:
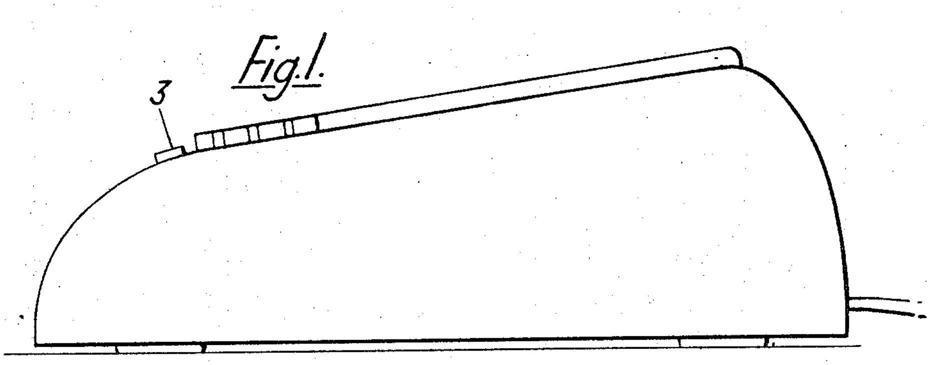
FIG. 1 is a side view of a repertory dialler according to the invention.
Figure 2:
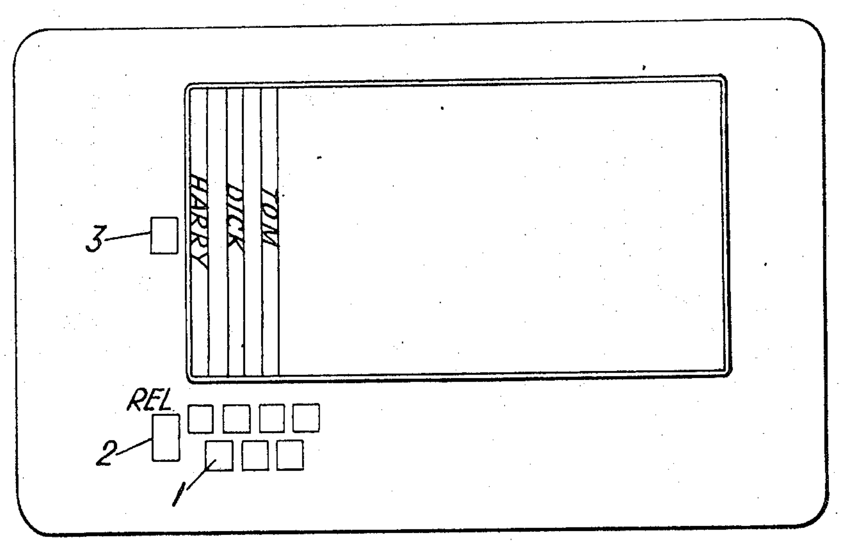
FIG. 2 is a top plan view of the dialler of FIG. 1.

A card is 4 inches wide by 2½ inches deep. To accommodate 19 digits and pauses the distance between centers of the digit busses must be about three-sixteenths inches. This means that the digit busses themselves can be one-eighth inch wide and the width one-sixteenth inch spacing. The holes in FIG. 2 are shown one-eighth inch wide and the finger leaves are assumed to be a little less than one-eighth inch width.

The circuit used is shown schematically in slightly more detail in FIG. 7, but in view of the preceding description it is not felt necessary to describe it in detail.

I claim:

1. A repertory dialler such as used at telephone subscriber stations, for the transmission therefrom of desired subscriber's numbers:

said dialler including a receptacle for the reception of a plurality of cardlike members;

each of said cardlike members having holes coordinately arranged therethrough in a coded representation of a desired subscriber's number;

a plurality of digit busses;

means for maintaining said digit busses juxtaposed to one side of said holes of the coded representation of said cardlike members;

said digit busses being common to all of said cards and arranged as column wires extending along one face of each of said cards, each of said column wires comprising a continuous ribbon of insulating material having a number of copper strips embedded on the face of the ribbon for contiguous contact with said cards;

binary bus means;

said binary bus means comprising a plurality of binary busses;

said binary bus means further comprising binary board means for extending conductors through aligned ones of said holes to electrically connect selected ones of said digit busses to said binary busses;

said binary busses being arranged as row wires extended along the other face of said card, each of said row wires comprising a flexible finger for each column position on a card, which finger projects through said holes on the card to contact the appropriate column wire;

means for transmitting digit signals over said digit busses whereby any of said binary busses connected to the digit busses also carry said digit signals, wherein said transmitting means sequentially transmits said digit signals over said column wires;

means for selecting a desired one of said plurality of cardlike members;

said selecting means operating to connect the binary busses associated with said selected cardlike members to common wires;

counter means connected to said common wires for generating dial pulses responsive to the digit signals received on said common wires with said pulses corresponding to the desired subscriber's number;

card holding means retaining each of said cardlike members in said receptacle;

each of said card holders being pivotably supported between a pair of slotted rails;

there being a set of row wires on one side and a set of column wires on the other side of said holders;

means for rotating all of said holders in said slotted rails to provide a staggered edge, when the dialler is in use for reading any inscriptions at the top of said cards; and means responsive to the pivoting of said card holders for causing said fingers to extend through the appropriate holes in all of said cards to couple said digit busses and said binary busses at all of said cards.

2. The repertory dialler of claim 1 wherein said pivoting means comprises a rear pressure plate which moves forward to cause the rotation of said coded cardlike members.